United States Patent [19]

Kanatsu et al.

[11] 3,940,541

[45] Feb. 24, 1976

[54] METHOD FOR THE PRODUCTION OF A DECORATIVE GYPSUM BOARD

[75] Inventors: Shinsaku Kanatsu; Akira Takahara, both of Tokyo, Japan

[73] Assignee: Mitsui Toatsu Chemicals, Incorporated, Tokyo, Japan

[22] Filed: June 6, 1973

[21] Appl. No.: 367,494

[52] U.S. Cl. ............. 428/342; 156/44; 156/45; 156/277; 428/425; 428/537; 428/538
[51] Int. Cl.² ......................... B32B 31/12
[58] Field of Search ........... 156/44, 43, 45, 39, 78, 156/79, 277; 52/309; 161/43; 428/342, 425, 537, 538

[56] References Cited
UNITED STATES PATENTS

| | | | |
|---|---|---|---|
| 3,616,144 | 10/1971 | Kenney | 156/45 |
| 3,660,187 | 5/1972 | Shortway et al. | 156/79 |
| 3,677,874 | 7/1972 | Sterrett et al. | 52/309 |
| 3,694,298 | 9/1972 | Veschuroff et al. | 156/44 |
| 3,798,098 | 3/1974 | Ogawa et al. | 156/78 |

FOREIGN PATENTS OR APPLICATIONS 519,920   12/1955   Canada .................... 156/44

*Primary Examiner*—Douglas J. Drummond
*Assistant Examiner*—Basil J. Lewris
*Attorney, Agent, or Firm*—Fisher, Christen & Sabol

[57] ABSTRACT

In the production of decorative gypsum board, wherein a hemihydrate gypsum slurry is continuously injected between decorative gypsum board card paper and conventional gypsum board card paper and the thus slurry-injected sheets are pressed by a suitable means to form the sheets in a predetermined thickness and then dried to form the decorative gypsum board, the improvement comprising coating with an urethane resin solution over decorative low-weight basis paper such as tissue paper or machine glazed white paper, drying the coated paper and laminating the resultant paper to a gypsum board card paper to obtain said decorative gypsum board card paper.

5 Claims, No Drawings

METHOD FOR THE PRODUCTION OF A DECORATIVE GYPSUM BOARD

DETAILED DESCRIPTION OF THE INVENTION

This invention relates to an improved method for the production of decorative gypsum board and a product obtained thereby.

Gypsum board has generally industrially been produced by mixing gypsum hemihydrate, a light weight additives such as of pealite, a setting-time adjusting agent and a suitable amount of water by means of a mixer to give a slurry, continuously injecting the mixture between gypsum board card papers, pressing the mixture-injected boards between rollers to form the boards in a predetermined thickness, and then subjecting the boards to a drying step.

While in the production of decorative gypsum boards, gypsum board card paper on one surface of which a suitable pattern such as of a wood grain type has been preliminarily printed is generally used. Decorative gypsum board card paper is generally required to have suitable water permeability since the bonding between gypsum and the card paper, which is one of important properties of decorative gypsum board as well as of gypsum board, is derived from permeation of a gypsum hemihydrate slurry into card paper and hardening of the gypsum hemihydrate into gypsum. Moreover, the card paper is also required to have suitable gas permeability so as to allow water vapor, which is generated in a drying step, to escape without causing any trouble of separation between layers of card paper.

In order to meet the requirements mentioned above, there is generally used as decorative gypsum board card paper on the surface of which a suitable pattern is merely directly printed, so that a pattern of the decorative gypsum board finally obtained lacks tone and depth in color, when compared with that of decorative plywood, due to poor printability of the gypsum board card paper used.

Moreover, where a decorative surface is discolored or stained, in use, it is difficult to cleanse the surface with washing.

It has been once proposed to use as a decorative material a synthetic resin film, synthetic resin-coated printing paper, or gypsum board card paper which is laminated with the above-mentioned synthetic resin film or the synthetic resin-coated printing paper because the synthetic resin or its film is excellent in properties such as water repellency, weatherability and resistance to stains. However, such materials are considered unsuitable for use as a gypsum board card paper due to their low gas permeability.

There has been further proposed a method for the production of a decorative gypsum board wherein a gypsum board is first produced by a conventional method and then a decorative material having excellent surface properties is laminated with or pressed on the gypsum board. However, this method is not necessarily industrially advantageous in that the gypsum board originally has a change in thickness ranging 0.3 – 1.0 mm, so that it is necessary to subject the substrate to a sanding or other suitable treatment before the pressing or laminating step for making the thickness thereof uniform. Moreover, it is disadvantageous to additionally require a pressing or laminating step from the economical point of view.

Furthermore, a method for the production of a decorative gypsum board has been known wherein a conventional printed gypsum board card paper is used and then the decorative gypsum board is coated with a synthetic resin by means of a roll coater or a flow coater. However, this is also disadvantageous in that the resin coated is absorbed in the gypsum board card paper, that the coated resin film is not made uniform due to a considerable change in thickness of the gypsum board substrate, and that it is difficult to uniformly coat edge portions of the gypsum board substrate with a resin, thus it being difficult to produce decorative gypsum boards having a predetermined quality level.

It is therefore an object of the present invention to provide a method for the production of a decorative gypsum board which overcomes the aforementioned disadvantages.

It is a further object of the invention to provide an improved method for the production of a decorative gypsum board which will improve surface properties of the board.

It is another object of the invention to provide an improved method for the production of a decorative gypsum board wherein the board is obtained using a laminated gypsum board card paper of a paper sheet having excellent printability and a conventionally used gypsum board card paper.

The present inventors have found through intensive studies on decorative gypsum board having excellent surface properties that when gypsum board card paper laminated with an urethane resin-coated paper sheet is used as decorative gypsum boards which have excellent surface properties can be produced in an industrial scale. That is, there is provided a method for the production of a decorative gypsum board wherein the decorative gypsum board comprises two sheets of card paper and gypsum which is sandwich between decorative card paper and conventional card paper, characterized in that the decorative gypsum board card paper is obtained by coating low-weight basis decorative paper with an urethane resin solution, drying the solution-coated paper, and bonding the resultant paper to a gypsym board card paper.

In this connection, a suitable pattern may be printed on the paper sheet prior to the urethane coating step for enhancing decorative effects of gypsum boards by printing. Examples of the low-weight basis and good quality paper which should have excellent printability include tissue paper, machine glazed white paper, etc.

As described hereinbefore, a gypsum board card paper should have excellent gas- and water-permeable properties so as not to cause any trouble concerning separation between layers of the board per se in a forming or drying step. In general, air resistance of the gypsum board card paper is required to be within 30 min when determined in accordance with "Test on Permeability" prescribed in Japanese Industrial Standard P-8117 (wherein a time period required for allowing 100 ml of air to be passed through a test specimen having an area of 645.16 cm$^2$ is determined). In this connection, when an urethane resin is applied onto a substrate board in an amount as small as 1 – 5 g/m$^2$, weather resistance, resistance to stains, etc., are remarkably improved and the air resistance of the board is maintained within the range.

The decorative gypsum boards obtained by the method of the present invention which use gypsum board card paper laminated with an urethane resin-coated paper sheet are excellent in depth and tone in color, as well as in weatherbility, resistance to stains, and surface strength since the printed paper is coated with an urethane resin.

The present invention is particularly illustrated in the following examples and comparative examples employing an aminoalkyd resin as a coating material.

EXAMPLE 1

A teak wood grain-like pattern was printed on tissue paper having weight basis of 23 g/m². Then, the printed tissue paper was coated with an urethane resin solution in an amount of 2 – 4 g/m² based upon a solid component by means of a roll coater and the coated paper was dried. The thus dried tissue paper was laminated by means of a laminator with gypsum board card paper with use of an vinyl acetate emulsion adhesive to obtain decorative card paper. Decorative gypsum board was produced in a conventional industrial manner by the use of the decorative gypsum board card paper and a hemihydrate gypsum slurry at a forming speed of 17 m/min. The resultant decorative gypsum board was cut into three test specimens, which were then subjected to an adhesion test (in accordance with "Test for adhesion between Gypsum and Gypsum board card paper" which is prescribed in Japanese Industrial Standard A 6904. 6.4). The three specimens passed the test without separation between the gypsum board card paper and gypsum.

As for surface properties of the decorative gypsum board, various kinds of tests were conducted in a manner as summarized in Table 1. The test results are shown in Table 2. As is apparent from Table 2, the decorative gypsum board of the present invention is superior in the surface properties to a prior-art decorative gypsum board using directly printed gypsum board card paper.

Table 1

| Test Item | Methods for Testing Surface Properties Test Method | |
|---|---|---|
| 1. Resistance to Stains | (1) | Two kinds of red and black inks and two kinds of fast-drying red and black inks were dropped on test specimens, respectively. 2 hours after the dropping, the dropped surface of the specimens was wiped with use of a piece of cloth moistened with a solvent or a detergent. |
| | (2) | Two 10 mm wide lines were drawn on a test specimen by the use of two sticks of orange and black crayons, respectively. 2 hours after the drawing, the line-drawn surface was rubbed by means of a cloth moistened with a detergent |
| | (3) | A higher alcohol-base neutral detergent was dropped on a test specimen. 2 hours after the dropping, the detergent-dropped surface was rinsed with water. |
| 2. Water repellency | | Water was dropped on a test specimen. 2 hours after the dropping, the water was wiped with a cloth. |
| 3. Resistance to abrasion | | Surfaces of a test specimen was strongly rubbed with a piece of gauze moistened with water. |
| 4. Adhesive tape test | | A commercially available 12 mm wide adhesive tape was bounded to a test specimen. The tape was strongly peeled off in the vertical direction or in the horizontal direction with respect to the surface of the test specimen. |

Table 2

| Test Item | | Test Results Decorative Gypsum Board of the Invention | Prior-art Decorative* Gypsum board |
|---|---|---|---|
| 1. | Resistance to stains | | |
| | (1) Red ink | Extremely excellent | Bad |
| | Black ink | Good | Bad |
| | Fast-drying red ink | Extremely excellent | Bad |
| | Fast-drying black ink | Relatively good | Bad |
| | (2) Orange crayon | Extremely excellent | Good |
| | Black crayon | Extremely excellent | Good |
| | (3) Neutral detergent | Extremely excellent | Bad |
| 2. | Water repellency | Extremely excellent | Good |
| 3. | Resistance to abrasion | Extremely excellent (No change appeared even at 300 times of rubbing) | Bad (Substantial changes appeared at 10 times rubbings) |
| 4. | Adhesive tape test | | |
| | Vertical peeling direction | No change | Separation between layers of board |
| | Horizontal peeling | No change | Separation between |

Table 2-continued

| Test Item | Test Results Decorative Gypsum Board of the Invention | Prior-art Decorative* Gypsum board |
|---|---|---|
| direction | | layers of board |

*Note: A prior-art decorative gypsum board means one which uses a gypsum board card paper on which a suitable pattern is directly printed.

EXAMPLE 2

A zelcova wood grain-like pattern was printed on machine glazed white paper having a weight basis of 35 g/m². Then, the printed machine glazed paper was coated with an urethane resin solution in an amount of 3 – 5 g/m² based on a solid component by means of a roll coater, and the coated paper was dried. The thus dried paper was laminated to gypsum board card paper with use of a vinyl acetate emulsion adhesive by means of a laminator.

Decorative gypsum board was produced in a conventional industrial manner by the use of the decorative card paper and a gypsum slurry at a forming speed of 20 m/min.

The resultant decorative gypsum board was cut into three test specimens, which were then subjected to an adhesion test (which is prescribed in Japanese Industrial Standard A 6904. 6.4 as "Test for Adhesion between Gypsum and Gypsum board card paper"). The three specimens passed the test without separation between the gypsum board card paper and gypsum.

As for surface properties of the decorative gypsum board, the same tests as in Example 1 were conducted. The test results are shown in Table 3 below. It is apparent from the Table that the decorative gypsum board of the present invention is far superior in the surface properties to a prior-art decorative gypsum board.

Comparative Example 1

A teak wood grain-like pattern was printed directly on a gypsum board card paper. Then, the printed board was coated with 8 – 11 g/m² of an aminoalkyd resin by means of a roll coater, and the thus coated board was dried at 70° – 115°C.

The thus obtained decorative gypsum board card paper had air resistance of 65 min when determined by the method described hereinbefore. Then, decorative gypsum board was produced in a conventional industrial manner by the use of the decorative gypsum board card paper and a gypsum slurry at a forming speed of 17 m/min.

The resultant decorative gypsum board had blisters on the surface thereof. The decorative gypsum board was cut into three test specimens, which were then subjected to a test for adhesion between gypsum and the decorative gypsum board card paper in the same manner as described in Example 1. As a result, two test specimens did not pass the test, thus the aminoalkyd resin-coated decorative gypsum board being unsatisfactory.

COMPARATIVE EXAMPLE 2

A zelkova wood grain-line pattern was printed on white machine glazed paper having a weight basis of 35 g/m². The printed paper was coated with 2 – 4 g/m² of Table 3

| | Test Item | | Decorative Gypsum Board of the Invention | Prior-art Decorative Gypsum Board |
|---|---|---|---|---|
| 1. | Resistance to stains | | | |
| | (1) | Red ink | Extremely excellent | Bad |
| | | Black ink | Good | Bad |
| | | Fast-drying red ink | Relatively good | Bad |
| | | Fast-drying black ink | Relatively good | Bad |
| | (2) | Orange crayon | Extremely excellent | Good |
| | | Black crayon | Extremely excellent | Good |
| | (3) | Neutral detergent | Extremely excellent | Bad |
| 2. | Water repellency | | Extremely excellent | Good |
| 3. | Resistance to abrasion | | Excellent (No change appeared even at 200 times of rubbings) | Bad (Change appeared on surfaces only at 10 times of rubbings) |
| 4. | Adhesive tape test | | | |
| | Vertical peeling direction | | No change | Separation between layers of board |
| | Horizontal peeling direction | | No change | Separation between layers of board |

The following two comparative examples were shown for the production of decorative gypsum boards having aminoalkyd resin-coated gypsum board card paper, for comparison with the decorative gypsum board of the present invention as obtained in the foregoing examples.

an aminoalkyd resin by means of a roll coater, and the thus coated paper was dried. The dried paper was laminated on a gypsum board card paper with use of a vinyl acetate emulsion adhesive. The thus laminated decorative gypsum board card paper had an air resistance of 23 min when determined in accordance with a method of Japanese Industrial Standard P 8117.

Then, a decorative gypsum board was produced in a conventional industrial manner by the use of the decorative card paper and a gypsum slurry at a forming speed of 20 m/min.

The resultant decorative gypsum board was cut into three test specimens for conducting an adhesion test in the same manner as in Comparative Example 1. As a result, the three test specimens passed the test with separation between the board and gypsum. Moreover, the decorative gypsum board was subjected to tests for surface properties in a manner similar to those of Example 1. Test results are shown in Table 4. It is apparent from the Table that the aminoalkyd resin-coated decorative gypsum board is inferior in surface properties to the decorative gypsum board of the invention.

Table 4

| | Test Item | Decorative Gypsum Board of the Invention | Decorative Gypsum Board of Comparative Example 2 |
|---|---|---|---|
| 1. | Resistance to stains | | |
| | (1) Inks | | |
| | Red ink | Extremely excellent | Good |
| | Black ink | Good | Bad |
| | Fast-drying red ink | Extremely excellent | Good |
| | Fast-drying black ink | Relatively good | Bad |
| | (2) Crayons | | |
| | Orange crayon | Extremely excellent | Good |
| | Black crayon | Extremely excellent | Good |
| | (3) Neutral detergent | Extremely excellent | Bad |
| 2. | Water repellency | Extremely excellent | Good |
| 3. | Resistance to abrasion | Extremely excellent (No change occurs even at 200 times of rubbing) | Good (Streak observed at 50 times of rubbings) |
| 4. | Adhesive tape test | | |
| | Vertical peeling direction | No change | Separation between gypsum board card paper |
| | Horizontal peeling direction | No change | Separation between layers of board |

What is claimed is:

1. Decorative gypsum board which comprises gypsum sandwiched between sheets of gypsum board card paper, at least one of said sheets comprising a low-weight basis decorative paper coated with 1–5 g/m² based upon the solid component of a urethane resin and laminated to gypsum board card paper.

2. The decorative gypsum board according to claim 1 wherein said low-weight basis paper is selected from the group consisting of tissue paper and machine glazed white paper.

3. In the production of decorative gypsum board wherein a hemihydrate gypsum slurry is placed between sheets of gypsum board card paper, at least one of which is decorative, and dried to produce said board, the improvement comprising coating low-weight basis decorative paper with a urethane resin in an amount of 1–5 g/m² based on the solid component, drying the resin-coated paper, laminating the resultant paper to a gypsum board card paper, and utilizing said laminated paper as the decorative card paper upon which the slurry is placed.

4. A method according to claim 3, further comprising printing a suitable pattern on the low-weight basis decorative paper prior to the coating step.

5. A method according to claim 3, wherein said low-weight basis paper is selected from the group consisting of tissue paper and machine glazed white paper.

* * * * *

UNITED STATES PATENT OFFICE
CERTIFICATE OF CORRECTION

Patent No. 3,940,541                                  Dated February 24, 1976

Inventor(s) Shinsaku KANATSU et al

It is certified that error appears in the above-identified patent and that said Letters Patent are hereby corrected as shown below:

Col. 1, line 11, "pealite" should be --perlite--

Col. 4, line 8 , "6904" should be --6901--

Col. 5, line 28, "6904" should be --6901--

Col. 6, line 13, "board" should be --board card paper--

Col. 6, line 15, "board" should be --board card paper--.

Signed and Sealed this thirtieth Day of August 1977

[SEAL]

Attest:

RUTH C. MASON
*Attesting Officer*

C. MARSHALL DANN
*Commissioner of Patents and Trademarks*